United States Patent [19]

Farr

[11] 4,203,710
[45] May 20, 1980

[54] UNIFIED PUMP AND GENERATOR ARRANGEMENT

[75] Inventor: James B. Farr, Ann Arbor, Mich.

[73] Assignee: Tecumseh Products Company, Tecumseh, Mich.

[21] Appl. No.: 900,531

[22] Filed: Apr. 27, 1978

Related U.S. Application Data

[63] Continuation-in-part of Ser. No. 734,116, Oct. 20, 1976, Pat. No. 4,095,922.

[51] Int. Cl.² ............................................. F04B 21/00
[52] U.S. Cl. .................................. 417/53; 123/195 A; 123/198 C; 310/74; 310/153; 417/313; 417/362
[58] Field of Search .................... 417/53, 313, 362; 123/195 A, 149 R, 198 R, 198 C; 310/74, 153; 62/323

[56] References Cited

U.S. PATENT DOCUMENTS

| | | | |
|---|---|---|---|
| 1,422,995 | 7/1922 | Link | 123/195 A |
| 1,672,191 | 6/1928 | Anderson et al. | 123/195 A |
| 2,002,230 | 5/1935 | Wright | 123/195 A |
| 2,079,724 | 5/1937 | Ranst | 123/195 A |
| 2,792,820 | 5/1957 | Leach | 123/195 A |
| 3,153,388 | 10/1964 | Cheely | 123/195 A |
| 3,498,272 | 3/1970 | Roper | 123/195 A |
| 3,663,850 | 5/1972 | Phelon | 310/153 |
| 3,828,212 | 8/1974 | Harkness et al. | 310/153 |
| 4,095,922 | 6/1978 | Farr | 417/313 |

FOREIGN PATENT DOCUMENTS

| | | | |
|---|---|---|---|
| 1041731 | 10/1958 | Fed. Rep. of Germany | 123/195 A |
| 1503618 | 4/1970 | Fed. Rep. of Germany | 417/15 |

*Primary Examiner*—John J. Vrablik
*Assistant Examiner*—Edward Look
*Attorney, Agent, or Firm*—Albert L. Jeffers

[57] ABSTRACT

A combined pump and generator arrangement for use in a vehicle having an engine as the prime mover is disclosed and includes a pump housing with an axially extending actuating shaft and a rotatable member to be driven by the engine to rotate about that actuating shaft with the rotatable member including a fan and a pulley as well as a magnetic arrangement for providing a rotating magnetic field when the rotatable member is driven by the engine. An annular stator assembly is fastened to a face of the pump housing and has windings for providing a voltage in response to the rotating magnetic field. The actuating shaft and annular stator assembly are concentrically disposed with the stator assembly lying intermediate the actuating shaft and the magnetic arrangement of the rotor. The pulley, stator and magnetic arrangement and the fan are supported progressively more remote from the pump housing face. In one preferred form the pump is a vehicle engine coolant pump with the pulley comprising a rim portion of a hub member which is concave in the direction toward the pump with a portion of the pump extending beyond the rim and into the hub concavity so that the forces exerted on the pump bearing by the belt driving the pulley lie generally in a plane including the pulley drive belt with pump bearings extending to either side of that plane. This allows the pump bearings to also function as the generator bearings without unduly shortening bearing life.

In assembly, the pump is affixed to the engine and the alternator stator affixed to the pump face and thereafter the pump drive pulley is passed through the stator and attached to the pump actuating shaft. The generator rotor is supported for rotation with the pulley so that a portion of the rotor spans the stator, and the pulley lies intermediate the stator and the pump.

19 Claims, 2 Drawing Figures

UNIFIED PUMP AND GENERATOR ARRANGEMENT

CROSS REFERENCE TO RELATED APPLICATIONS

This application is a continuation-in-part of my copending application Ser. No. 734,116, filed Oct. 20, 1976, and entitled "ELECTROMECHANICAL DEVICE; now U.S. Pat. No. 4,095,922".

BACKGROUND OF THE INVENTION

The present invention relates generally to a multipurpose electromechanical device which provides a pumping function such as might be required in circulating a coolant through a vehicle engine as well as an electrical energy generating function to obviate the need for, for example, a separately driven vehicle alternator.

In the past, vehicles have included a prime mover, such as an internal combustion engine, which is addition to supplying energy to drive the vehicle, also provides energy to a number of other devices through a maze of V-belts, pulleys and the like. Specifically, such an engine may drive an electrical generator such as an alternator, a water pump, a power steering pump, an air-conditioner pump or compressor, various anti-pollution devices, as well as other auxiliary devices.

The typical alternator is engine driven by a V-belt and a relatively small diameter pulley, for example of the order of two and one half inches in diameter. The alternator therefore typically revolves at a relatively high speed generating a relatively high frequency alternating current voltage. With such a relatively high frequency alternating current voltage, stator core losses are relatively high, and with such a small diameter pulley, belt slippage may be a substantial problem. Prior to the development of my copending parent application, Ser. No. 734,116, now U.S. Pat. No. 4,095,922, larger pulleys and lower frequencies have heretofore not been practical.

It is also known in the prior art, for example in U.S. Pat. No. 2,660,865, to provide a common shaft for a pump and an electrical generator, however, such prior art approaches have amounted to little more than placing the two devices end to end with a common drive shaft so that the overall axial length, weight and cost, has been substantially the sum of those traits for the respective individual devices.

My copending application Ser. No. 734,116 has combined a vehicle generator with another vehicle pump such as an air conditioner compressor, water pump, or the like, eliminating several components and reducing the size and weight, as well as the cost of the resultant assembly.

For example in FIG. 5 of my copending application, there is illustrated a water pump alternator assembly wherein the alternator shares with the water pump the bearings typically found in such pumps. The alternator stator is mounted to the face of the water pump with the water pump shaft extending through the stator to support on the side thereof opposite the water pump a permanent magnet rotor as well as a drive pulley and fan. In this arrangement, the alternator stator and rotor, drive pulley and fan are located progressively more remote from the water pump face. With the pulley disposed substantially outboard of the pump bearings, considerable twisting force is applied to the pump shaft by way of the drive pulley substantially shortening bearing life. Further with the component arrangement of FIG. 5 of my aforementioned copending application, the pulley is disposed between the vehicle engine fan and the alternator, thereby impeding the flow of air through the alternator for cooling that alternator.

SUMMARY OF THE INVENTION

Among the several objects of the present invention may be noted the provision of a single electromechanical device which will supplant the typical vehicle generator and pump; the provision of a space, weight and cost saving arrangement wherein an alternator rotor is rotatably supported on the bearings required for a pump, and the stator assembly is supported on the pump housing; the provision of an alternator function of reduced frictional and eddy current losses, as compared to conventional alternator arrangements; the provision of an electromechanical device which provides an alternator function while lessening the noise associated with prior art alternators due to belt slippage and high speed of operation or rapid acceleration; the provision of a combined alternator water pump arrangement wherein the drive pulley for the arrangement is disposed generally in a plane which cleaves a pump bearing; the provision of a combined pump alternator arrangement wherein the alternator components are cooled by the direct flow of air from the vehicle fan; the provision of an alternator and drive pulley structure and assembly process wherein the pulley may be passed through an alternator stator bore and journaled to support and drive an alternator rotor, which rotor spans the alternator stator; and the provision of a method of assembling a pump and alternator characterized by its economization of weight, space and cost.

In general, a pump and alternator are assembled with an engine by affixing the pump to the engine and affixing the alternator stator to the pump. A pump drive pulley is passed through the stator and attached to the pump actuating shaft and an alternator rotor is supported for rotation with the pulley where a portion of the rotor spans the stator, and the pulley is disposed intermediate the stator and the pump. Typically, the alternator stator is affixed to the pump prior to affixing the pump to the engine and the alternator rotor is joined to the pulley prior to passing the pulley through the stator bore. Thus, there is a mechanical interconnection between the pulley and the rotor which extends through the relatively fixed stator annular opening.

Also in general and in one form of the invention, a unified pump generator for a vehicle engine includes a pump with a housing having a face and pump bearings supported in the housing as well as a rotatable driving shaft journaled in the bearings and extending from the housing face. A rotatable hub member is supported on the shaft for rotation thereabout and a generator stator is mounted on and supported solely by the housing face. A generator rotor is fixedly secured to the hub so that the hub and generator rotor are rotatably supported by the pump bearings with the rotor being positioned radially outward of the stator and concentric with the shaft. The hub includes a pulley for driving the pump shaft and generator rotor and that pulley is disposed intermediate the pump housing and the generator stator. The pump may, for example, be a vehicle engine coolant pump with the hub member concave in the direction toward the pump and the pulley comprising a rim portion of that hub so that a portion of the pump including bearings of the pump may extend beyond the rim and into the hub concavity.

BRIEF DESCRIPTION OF THE DRAWING

In the several drawing views, like reference numerals identify like parts. The following is illustrative of the invention in one form and is not to be construed as limiting in any manner.

DESCRIPTION OF THE PREFERRED EMBODIMENT

Figure 1:
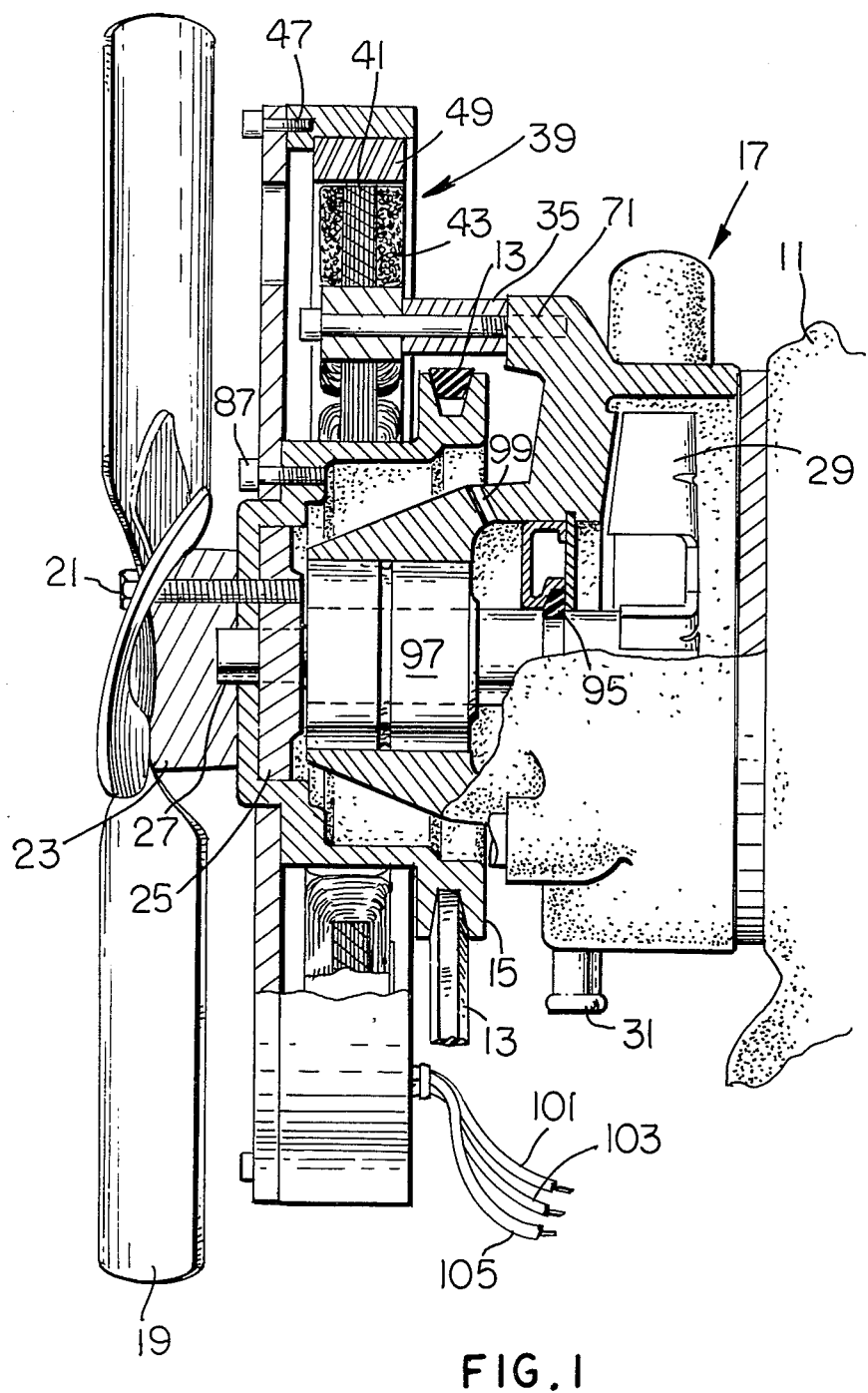
FIG. 1 is a side view, partially in cross-section, of the combined pump and generator arrangement of the present invention in one preferred form.

Referring to the drawing in general, a vehicle prime mover, such as an internal combustion engine 11, will have a pulley driven, for example, by the engine crankshaft and that pulley will be coupled by way of a V-belt 13 to drive pulley 15 whenever the engine is running. Pulley 15 drives the alternator of the present invention as well as the water pump 17. A fan blade 19 is mounted by means of bolts, such as 21, to a spacer 23, and ultimately to flange 25 associated with the water pump drive shaft 27. Water pump 17 has an impeller 29 which circulates a coolant through the block of the engine 11 by way of various pump inlets and outlets, such as 31, when the shaft 27 is driven. The water pump has an outer housing face 33 to which, by way of spacers 35 or bosses 37, integral with the pump housing, the generator stator 39 may be attached. Stator 39 includes a laminated slotted annular magnetic core 41 with a plurality of windings, such as 43 and 45, having opposite side portions disposed in those stator core slots. Pulley 15 is engine driven and in turn drives a flywheel 47 in which are supported permanent magnets, such as 49 and 51, with these rotatable magnets in conjunction with the stator 39, providing a generator, for example of the alternator type. As is most easily seen in FIG. 1, the alternator is mounted directly behind the vehicle cooling fan 19 without any intervening structure such as pulleys or the like to impede the cooling of the alternator windings, as well as silicon controlled rectifiers or diodes associated with that alternator by the vehicle fan.

The present invention may be employed with a variety of known types of pumps, however, for an illustrative example water pump 17 is assumed to be the type having an open rear face (not shown) for receiving water from the engine block by way of an opening 53 at the engine water pump interface. Pump 17 is affixed to the engine 11 by, for example, three bolts passing through mounting holes 55, 57 and 59 and into threading engagement with corresponding holes 61, 63 and 65 in the engine block. A conventional radiator hose would then be connected to outlet 31 for circulating the engine coolant, as desired.

Figure 2:
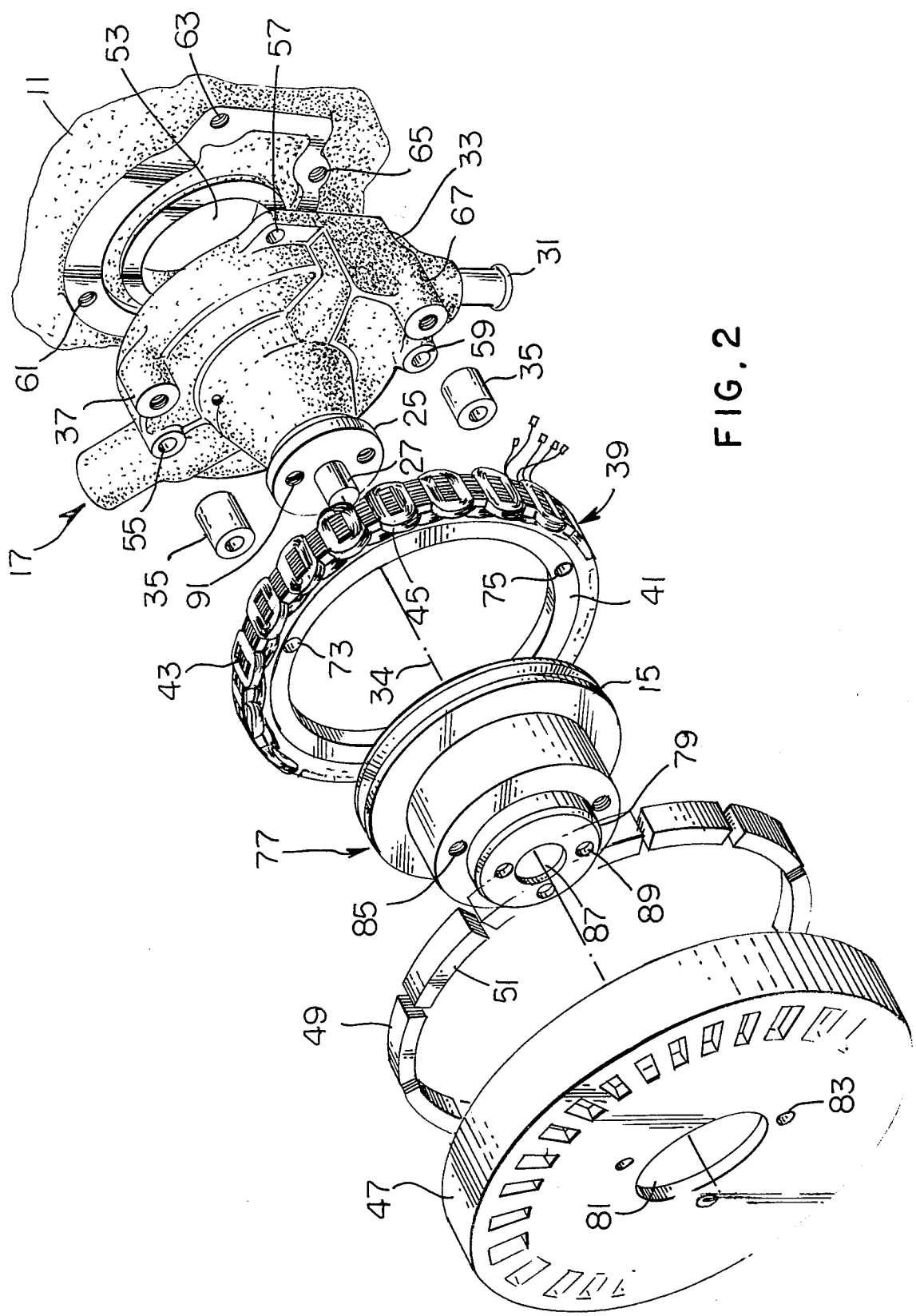
FIG. 2 is an exploded, perspective view of a pump and alternator substantially the same as that illustrated in FIG. 1 and showing the method of assembly with an engine.

The water pump face 33 (the side of the pump housing opposite the pump engine interface) has in FIG. 2 a plurality, such as three, bosses 37 and 67 cast as part of the housing and extending therefrom for receiving the stator 39. As an alternate as illustrated in FIG. 1, spacers such as 35, for example of the hollow sleeve variety, may be employed with bolts 69 engaging corresponding threaded holes, such as 71, in the pump housing. The alternator stator 39 then is simply affixed to the pump by passing three bolts through openings, such as 73 and 75, and into threaded engagement with the threaded openings in the ends of the respective bosses 37 and 67.

The several permanent magnets, such as 49 and 51, are bonded to the inner rim of the flywheel 47, and that flywheel, which provides the alternator rotor function, is assembled with hub 77 by passing the end 79 of that hub through the opening 81 in the flywheel to align a trio of mounting holes, such as 83, with a corespounding set of threaded mounting holes 85 in the hub. Three mounting screws, such as 87, are then passed through opening 83 and threaded into the opening 85 so that the alternator rotor is supported for rotation with the pulley 15.

The pulley may now be passed through the opening in the annular stator 39 while at the same time the alternator rotor passes over the stator 39 with the rotating flange 25 entering the concave part of the hub 77 until the flange 25 comes to rest against the bottom of that concave portion, with the shaft 27 extending from the hub opening 87, and the trio of hub mounting holes 89 are aligned with three similar holes, such as 91, in the flange 25. These holes 91 are typically threaded so that bolts, such as 21, may be passed through the fan 19, spacer 23, hub 77, and into engagement with the rotating flange 25, to thereby rotatably support the hub, rotor and fan on the pump shaft 27.

In FIG. 1, it will be noted that the pump itself, in addition to containing the impeller 29, has a coolant seal 95 and a front roller bearing 97 for journaling the shaft 27. In the event of leakage past the seal 95, the coolant may flow out opening 99, rather than seeping past bearing 97. Bearing 97 and its associated pump housing portion lies within the concavity of the hub 77 so that the general plane of lateral force exerted on the pulley 15 by the belt 13 is seen to cleave the bearing 97. In other words, there are portions of the water pump bearing to either side of the general plane of the pulley 15. Such an arrangement minimizes the twisting forces exerted on the pump bearings, thereby providing longer life to those bearings. With this arrangement, the pulley 15 is disposed intermediate the pump housing 17 and the generator stator 39.

The several stator windings, such as 43 and 45, may be interconnected to form a three phase alternator winding configuration and the three leads 101, 103 and 105 connected to a voltage regulator of the type, for example disclosed in my aforementioned copending application.

In addition to the aforementioned advantages, it should be noted that the magnetic core 41 is of an annular configuration so that the hub 77 may be passed therethrough. The laminations forming this magnetic core 41 will have a rather large circular portion stamped from the center thereof and this circular portion rather than being scrap may be further fabricated to provide both stator and rotor laminations for other dynamoelectric machines. The opening through the stator 41 is somewhat greater than five inches in diameter so that the pulley 15 may be nearly a five inch pulley. In addition to providing the desired alternator speed, such a pulley being comparitively smaller than conventionally employed water pump pulleys, will also allow the use of a somewhat smaller water pump since that water pump will be driven about half again its normal speed.

Thus while the present invention has been described with respect to a specific preferred embodiment, numerous modifications will suggest themselves to those of ordinary skill in the art and accordingly the scope of the present invention is to be measured only by that of the appended claims.

What is claimed is:

1. The method of assembling a pump and alternator with an engine comprising the steps of:

affixing the pump to the engine;

affixing the alternator stator to the pump;

passing a pump drive pulley through the stator and attaching the pulley to the pump actuating shaft; and supporting an alternator rotor for rotation with the pulley with a portion of the rotor spanning the stator and with the pulley intermediate the stator and pump.

2. The method of claim 1 wherein the alternator stator is affixed to the pump prior to affixing the pump to the engine.

3. The method of claim 1 wherein the alternator rotor is joined to the pulley prior to passing the pulley through the stator.

4. The method of claim 1 wherein the stator is a generally annular member having an axis coaxial with the axis of rotation of the pump actuating shaft, the step of supporting including providing a mechanical interconnection between the pulley and rotor with that mechanical interconnection extending through the stator annular opening.

5. The method of claim 4 wherein the mechanical interconnection includes an axially extending pulley hub portion.

6. A unified pump-generator for a vehicle engine comprising:

a pump including a housing having a face, pump bearings supported in the housing and a rotatable driving shaft journaled in the pump bearings and axially extending from said housing face;

a rotatable hub member supported on said shaft for rotation about said shaft;

a generator stator mounted on and supported solely by said housing face;

a generator rotor fixedly secured to said hub member, the hub member and generator rotor rotatably supported by the pump bearings, said rotor positioned radially outward of the stator and concentric with said shaft;

said hub member including a pulley for driving the pump shaft and generator rotor, the pulley being disposed axially intermediate the pump housing and the generator stator.

7. The unified pump-generator of claim 6 wherein the generator stator comprises a slotted generally annular magnetic core with the inside diameter of the magnetic core being greater than the outside diameter of the pulley so that the pulley may be passed through the magnetic core.

8. The unified pump-generator of claim 7 wherein the generator stator further comprises a plurality of coils having sides thereof disposed in the magnetic core slots, the coils being interconnected to form a three phase alternator winding.

9. The unified pump-generator of claim 6 further comprising belt drive means for drivingly coupling the pulley to the vehicle engine, the pulley and belt drive means disposed generally in a plane that cleaves a pump bearing.

10. The unified pump-generator of claim 6 further including a fan supported on and rotatable with said hub, the pulley, generator stator and rotor, and fan being progressively more remote from the pump housing face.

11. The unified pump-generator of claim 6 further comprising belt drive means for drivingly coupling the pulley to the vehicle engine, the belt drive means exerting a force on the pulley which force is directed generally in a plane containing the belt drive means, the plane being disposed generally perpendicular to the axis of rotation of the pump shaft, and the pump bearings extending to either side of the plane.

12. The unified pump-generator of claim 6 wherein the pump is a vehicle engine coolant pump.

13. The unified pump-generator of claim 6 wherein the hub member is concave in the direction toward the pump, the pulley comprising a rim portion of the hub and a portion of the pump extending beyond the rim into the hub concavity.

14. The unified pump-generator of claim 13 wherein the pump bearings are in part disposed in the pump portion which extends into the hub concavity.

15. For use in a vehicle having an engine as the prime mover, a combined pump and generator arrangement comprising:

a pump housing having an axially extending actuating shaft extending therefrom;

a rotatable member adapted to be driven by the engine to rotate about the actuating shaft axis including a fan and a pulley;

magnet means supported on the rotatable member to provide a rotating magnetic field when the rotatable member is driven by the engine; and an annular stator assembly fastened to a face of the pump housing and having windings for providing an electric voltage in response to the rotating magnetic field, the actuating shaft and annular stator assembly being concentrically disposed with the annular stator assembly intermediate the actuating shaft and the magnet means, the pulley, stator and magnet means, and fan being progressively more remote from the pump housing face.

16. The arrangement of claim 15 wherein the annular stator comprises a slotted generally annular magnetic core being greater than the outside diameter of the pulley so that the pulley may be passed through the magnetic core.

17. The arrangement of claim 15 further comprising belt drive means for drivingly coupling the pulley to the vehicle engine, the pulley and belt drive means disposed generally in a plane that cleaves a pump bearing.

18. The arrangement of claim 15 wherein the pump is a vehicle engine coolant pump.

19. The arrangement of claim 15 wherein the rotatable member comprises a hub concave in the direction toward the pump, the pulley comprising a rim portion of the hub and a portion of the pump extending beyond the rim into the hub concavity.

* * * * *